United States Patent
Elliott et al.

(12)

(10) Patent No.: US 6,751,402 B1
(45) Date of Patent: *Jun. 15, 2004

(54) SET-TOP BOX CONNECTABLE TO A DIGITAL VIDEO RECORDER VIA AN AUXILIARY INTERFACE AND SELECTS BETWEEN A RECORDED VIDEO SIGNAL RECEIVED FROM THE DIGITAL VIDEO RECORDER AND A REAL-TIME VIDEO SIGNAL TO PROVIDE VIDEO DATA STREAM TO A DISPLAY DEVICE

(75) Inventors: Timothy J. Elliott, Fountain Valley, CA (US); William B. Boyle, Lake Forest, CA (US)

(73) Assignees: Keen Personal Media, Inc., Lake Forest, CA (US); Keen Personal Technologies, Inc., Lake Forest, CA (US)

( * ) Notice: Subject to any disclaimer, the term of this patent is extended or adjusted under 35 U.S.C. 154(b) by 847 days.

This patent is subject to a terminal disclaimer.

(21) Appl. No.: 09/605,623

(22) Filed: Jun. 28, 2000

(51) Int. Cl.[7] ............... H04N 5/91; H04N 5/85; H04N 7/173

(52) U.S. Cl. ............. 386/83; 386/83; 386/125; 725/133

(58) Field of Search ............... 386/83, 46, 1, 386/124, 125, 45, 40, 126, 94, 35; 725/131, 133, 139, 141, 151, 153; 348/569; H04N 5/91, 5/85, 7/173

(56) References Cited

U.S. PATENT DOCUMENTS

| | | | |
|---|---|---|---|
| 4,879,611 A | * 11/1989 | Fukui et al. | 360/69 |
| 4,977,455 A | 12/1990 | Young | |
| 5,187,589 A | * 2/1993 | Kono et al. | 386/83 |
| 5,541,738 A | 7/1996 | Mankovitz | |
| 6,442,328 B1 | * 8/2002 | Elliott et al. | 386/46 |

* cited by examiner

Primary Examiner—Robert Chevalier
(74) Attorney, Agent, or Firm—Milad G. Shara, Esq.; Knobbe Martens Olson & Bear

(57) ABSTRACT

A set-top box is connectable to a digital video recorder that includes at least one recorder interface that supports connection of the digital video recorder to the set-top box, and a disk that stores a selected video segment. The digital video recorder has a video data stream manager that, in response to a real-time video signal, provides a first video stream to store the selected video segment on the disk, and that, in response to a command from the set-top box that initiates a playback interval, receives a second video stream based on the selected video segment stored on the disk to generate a recorded video signal. The digital video recorder is configured to (a) continuously receive the real-time video signal from the set-top box, and (b) provide the recorded video signal to the set-top box during the playback interval. The set-top box includes a video input interface that receives a broadcast signal to generate the real-time video signal, and a video output interface that provides an output video data stream to a display device. The set-top box further includes a microprocessor that recognizes connection of the digital video recorder to the set-top box, and that, in response to user input, generates the command that initiates the playback interval. The set-top box further includes at least one auxiliary interface that supports connection of the set-top box to the recorder interface of the digital video recorder, the auxiliary interface continuously providing the real-time video signal to the digital video recorder subsequent to the microprocessor recognizing connection of the digital video recorder to the set-top box. The set-top box further includes a multiplexer, coupled to the video output interface and the microprocessor. The multiplexer selects the real-time video signal during a real-time interval and selects the recorded video signal during the playback interval to generate the output video data stream that is provided to the display device.

23 Claims, 4 Drawing Sheets

SET-TOP BOX CONNECTABLE TO A DIGITAL VIDEO RECORDER VIA AN AUXILIARY INTERFACE AND SELECTS BETWEEN A RECORDED VIDEO SIGNAL RECEIVED FROM THE DIGITAL VIDEO RECORDER AND A REAL-TIME VIDEO SIGNAL TO PROVIDE VIDEO DATA STREAM TO A DISPLAY DEVICE

BACKGROUND OF THE INVENTION

1. Field of the Invention

The present invention relates to information storage and display systems utilizing rotating storage drives, and more particularly, to video recording systems that record video data streams.

2. Description of the Related Art

Digital video recorders provide the capability of concurrently recording incoming streaming video data using hard disk drive technology and playing back previously recorded video data. As currently available, a digital video recorder receives incoming streaming video data from the output interface of a standard set-top box configured to receive the broadcast signals from a multiple-service operator (MSO), such as a cable provider, and the output of the digital video recorder is transmitted directly to a display device, such as a television. Such standard set-top boxes typically have only one input interface and one output interface. In response to commands from the user, the digital video recorder transmits to the display device either the incoming streaming video data from the output of the set-top box or the previously recorded video data.

Because currently available digital video recorders receive their input from the standard output interfaces of currently available set-top boxes, such digital video recorders require numerous components which are duplicates of components already utilized by the set-top boxes. For example, in order to view digital broadcast channels using a standard television, a set-top box must convert the input digital broadcast channels into output video signals which conform to a standard format for composite video, such as the National Television Standards Committee (NTSC) standard. This standard output format is generated by various components in the set-top box, such as a transport demultiplexer ("DEMUX"), an MPEG decoder, and an NTSC encoder. Additionally, the output from the set-top box may contain information from an on-screen display module. This information may represent programming information. The information may also list specialty capabilities such as picture-in-picture, which the user can enable. A digital video recorder compatible with such a configuration must convert the NTSC composite video received from the set-top box back into digital form for storage, and then reconvert again to NTSC composite video to play back the stored video signals. Therefore, just as the set-top box did, the digital video recorder requires a transport DEMUX, an MPEG decoder, and an NTSC encoder, which effectively duplicate components and functions of the set-top box.

Similarly, currently available digital video recorders also include a standard input interface that receives the output from the set-top box, and a modem that is configured to receive electronic program guide information from the MSO. Both the input interface and the modem of the digital video recorder duplicate components or functions found in currently available set-top boxes.

There is, therefore, a need to provide the capabilities of currently available digital video recorders and set-top boxes, while also enabling the reduction of the redundancy of functions and components among these digital video recorders and settop boxes.

SUMMARY OF THE INVENTION

The present invention may be regarded as a set-top box connectable to a digital video recorder that includes at least one recorder interface that supports connection of the digital video recorder to the set-top box, and a disk that stores a selected video segment. The digital video recorder has a video data stream manager that, in response to a real-time video signal, provides a first video stream to store the selected video segment on the disk, and that, in response to a command from the set-top box that initiates a playback interval, receives a second video stream based on the selected video segment stored on the disk to generate a recorded video signal. The digital video recorder is configured to (a) continuously receive the real-time video signal from the set-top box, and (b) provide the recorded video signal to the set-top box during the playback interval. The set-top box comprises a video input interface that receives a broadcast signal to generate the real-time video signal, and a video output interface that provides an output video data stream to a display device. The set-top box further comprises a microprocessor that recognizes connection of the digital video recorder to the set-top box, and that, in response to user input, generates the command that initiates the playback interval. The set-top box further comprises at least one auxiliary interface that supports connection of the set-top box to the at least one recorder interface of the digital video recorder, the at least one auxiliary interface continuously providing the real-time video signal to the digital video recorder subsequent to the microprocessor recognizing connection of the digital video recorder to the set-top box. The set-top box further comprises a multiplexer, coupled to the video output interface and the microprocessor, which selects the real-time video signal during a real-time interval and selects the recorded video signal during the playback interval to generate the output video data stream that is provided to the display device.

DETAILED DESCRIPTION OF THE PREFERRED EMBODIMENT

Figure 1:
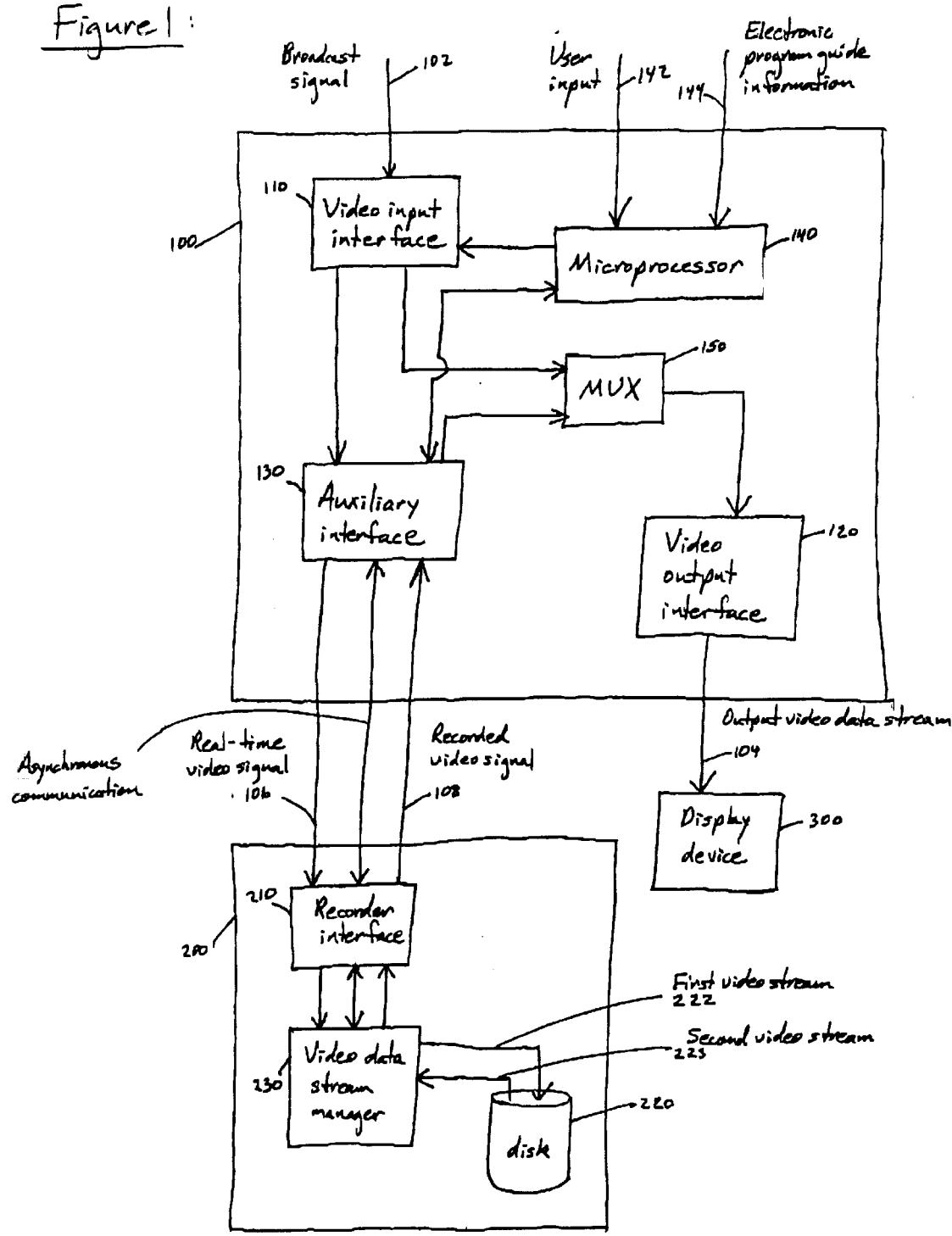
FIG. 1 schematically illustrates a set-top box in accordance with an embodiment of the present invention, the set-top box connectable to a recorder interface of a digital video recorder that, in response to a real-time video signal, stores a selected video stream on a disk, and that, in response to a command from the set-top box that initiates a playback interval, provides a recorded video signal to the set-top box during the playback interval.

FIG. 1 schematically illustrates a set-top box 100 in accordance with an embodiment of the present invention.

The set-top box 100 is connectable to a digital video recorder 200 that includes at least one recorder interface 210 that supports connection of the digital video recorder 200 to the set-top box 100, and a disk 220 that stores a selected video segment. The digital video recorder 200 has a video data stream manager 230 that, in response to a real-time video signal 106, provides a first video stream 222 to store the selected video segment on the disk 220, and that, in response to a command from the set-top box 100 that initiates a playback interval, receives a second video stream 223 based on the selected video segment stored on the disk 220 to generate a recorded video signal 108. The digital video recorder 200 is configured to (a) continuously receive the real-time video signal 106 from the set-top box 100, and (b) provide the recorded video signal 108 to the set-top box 100 during the playback interval. The set-top box 100 comprises a video input interface 110 that receives a broadcast signal 102 to generate the real-time video signal 106, and a video output interface 120 that provides an output video data stream 104 to a display device 300. The set-top box 100 further comprises a microprocessor 140 that recognizes connection of the digital video recorder 200 to the set-top box 100, and that, in response to user input 142, generates the command that initiates the playback interval. The set-top box 100 further comprises at least one auxiliary interface 130 that supports connection of the set-top box 100 to the recorder interface 210 of the digital video recorder 200, the auxiliary interface 130 continuously providing the real-time video signal 106 to the digital video recorder 200 subsequent to the microprocessor 140 recognizing connection of the digital video recorder 200 to the set-top box 100. The set-top box 100 further comprises a multiplexer 150, coupled to the video output interface 120 and the microprocessor 140, which selects the real-time video signal 106 during a real-time interval and selects the recorded video signal 108 during the playback interval to generate the output video data stream 104 that is provided to the display device 300.

In one embodiment of the present invention, the broadcast signal 102 is transmitted from a multiple-service operator, also known as an MSO. MSOs are video data service providers that supply video programming to multiple users. Examples of MSOs include, but are not limited to, cable television systems and satellite systems. Alternatively, the broadcast signal 102 can be received from UHF or VHF broadcast signals using an antenna. The broadcast signal 102 is typically in the form of analog rf signals containing video programming from multiple channels, and it may carry the video programming in analog or digital form.

In the preferred embodiment of the present invention, the microprocessor 140 of the set-top box 100 controls the operation of both the set-top box 100 and the digital video recorder 200 in response to user input 142 and electronic program guide information 144. By communicating with the video data stream manager 230 of the digital video recorder 200, the microprocessor 140 recognizes the connection of the digital video recorder 200 to the set-top box 100 and receives information regarding the first video stream 222 provided by the video stream manager 230 in response to the real-time video signal 106 to store the selected video segment on the disk 220. The microprocessor 140 also commands the video data stream manager 230 to receive the second video stream 223 based on the selected video segment stored on the disk 220 during a playback interval initiated by the user input 142. By communicating with the multiplexer 150 of the set-top box 100, the microprocessor 140 determines whether the real-time video signal 106 or the recorded video signal 108 is used to generate the output video data stream 104 provided to the display device 300. Times at which the real-time video signal 106 is used are denoted as real-time intervals, and times at which the recorded video signal 108 is used are denoted as playback intervals.

The user input 142 includes commands from the user to control various operation parameters of the set-top box 100 and the digital video recorder 200, such as record, playback, and display commands. In certain embodiments, the user input 142 includes the user turning on the set-top box 100 or the digital video recorder 200. Alternatively, the user input 142 is a playback command. The user input 142 is generated by the user using an appropriate communication technology, such as remote control devices or keypad devices. Persons skilled in the art are able to select an appropriate communication technology for the user to generate the user input 142.

The electronic program guide information 144 contains information regarding the broadcast schedules from various broadcast channels. In the embodiment illustrated in FIG. 1, the electronic program guide information 144 is a database containing information regarding the broadcast schedules from various broadcast channels. This information is typically expressed in the form of a program grid with columns denoting the time periods, and with separate rows for each of the available broadcast channels. In one embodiment, the electronic program guide information 144 is communicated to the microprocessor 140 via a separate input channel (e.g., via a phone line connection). Alternatively, in other embodiments of the present invention, the electronic program guide information 144 is received from the broadcast signal 102. In addition, the electronic program guide information 144 is temporarily stored in memory. The memory may be dedicated flash memory within the set-top box 100 or the digital video recorder 200. The memory may also be a portion of the disk 220 of the digital video recorder 200. Typically, the electronic program guide information 144 is communicated to the user by displaying it directly on the display device 300 being viewed by the user. The user may then provide appropriate user input 142 to the microprocessor 140, which uses the electronic program guide information 144 to generate appropriate commands. Persons skilled in the art are able to select an appropriate configuration of the electronic program guide information 144 and the method of communicating its information to both the user and the microprocessor 140 compatible with the present invention.

Figure 2:
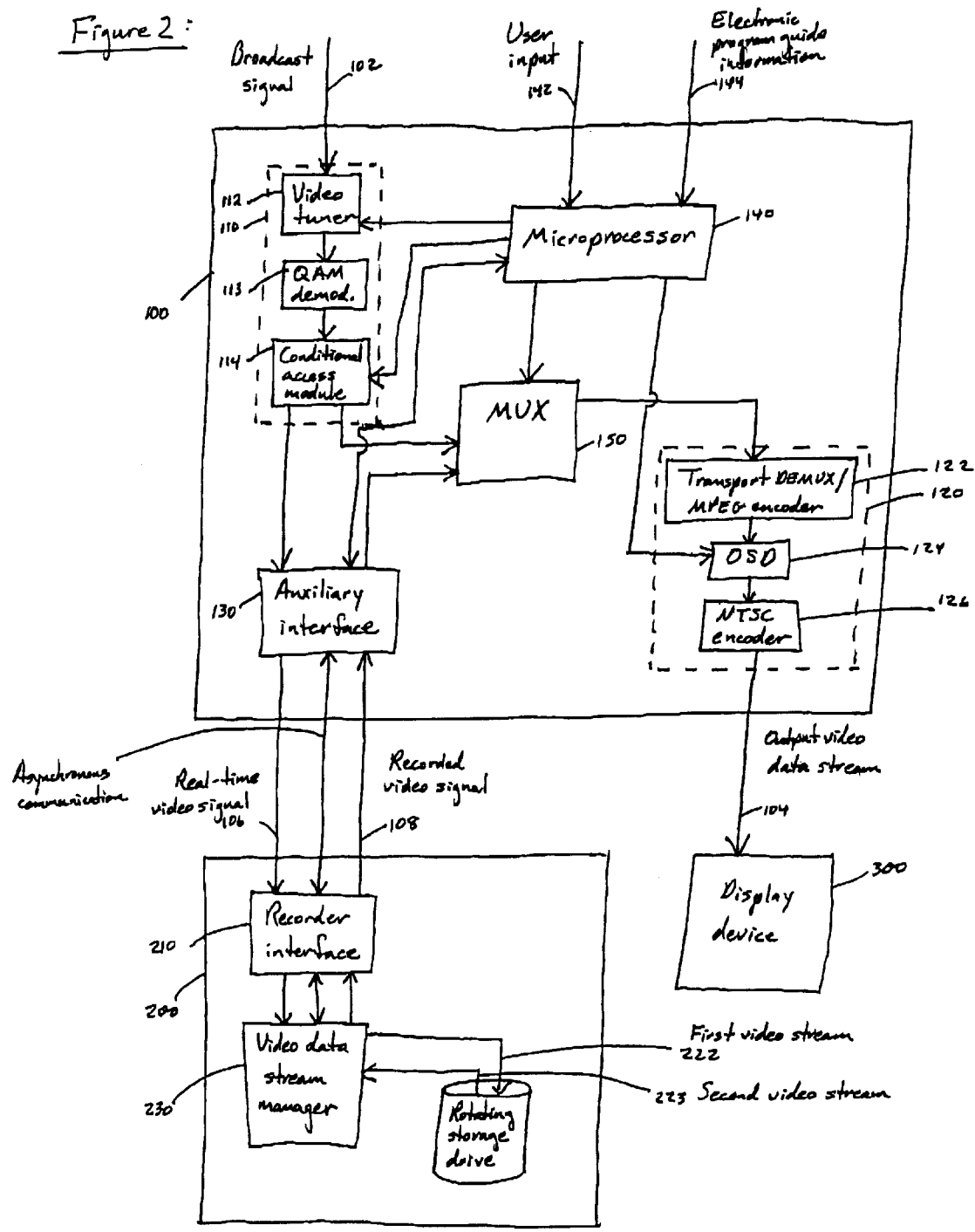
FIG. 2 schematically illustrates an exemplary embodiment of the present invention wherein the set-top box and digital video recorder are configured to be compatible with digital video programming.

FIG. 2 schematically illustrates one embodiment of the present invention compatible with a digital programming channel. Note that other embodiments of the present invention are compatible with analog programming channels, or both analog and digital programming channels. The video input interface 110 comprises a video tuner 112 that receives the broadcast signal 102, a quadrature amplitude modulation (QAM) demodulator 113, and a conditional access module 114. In response to commands from the microprocessor 140 in response to the user input 142, the video tuner 112 selects one transponder signal from the multiple transponder signals contained in the broadcast signal 102, and transmits the selected transponder signal to the QAM demodulator 113, which converts the analog rf signal into a digital signal. This digital signal corresponding to the selected transponder signal is a digitally-formatted video data stream compressed under an MPEG (Motion Pictures Experts Group) standard, such as MPEG-2 or MPEG-4, and is transmitted to the conditional access module 114. In other alternative embodiments, the selected transponder signal is compressed with other compression standards, including but not limited to, wavelet compression, motion JPEG compression, and DV25 compression. This digital signal contains approximately six separate digital video channels, and the conditional access module 114 selects one of these digital video channels in response to commands from the microprocessor 140 in response to the user input 142, and generates a compressed single program transport stream representation of the real-time video signal 106 that is transmitted to the multiplexer 150 and to the auxiliary interface 130.

During a real-time interval, defined as times in which the user input 142 indicates that the user wants to view the broadcast signal 102 in real-time, the microprocessor 140 commands the multiplexer 150 to transmit the real-time video signal 106 from the conditional access module 114 to the video output interface 120. In the preferred embodiment illustrated in FIG. 2, the video output interface 120 comprises a transport demultiplexer ("DEMUX")/MPEG decoder 122, an on-screen display (OSD) module 124 comprising a display multiplexer, and an NTSC encoder 126. The transport DEMUX/MPEG decoder 122 sorts out and synchronizes the compressed single program transport stream representation of the real-time video signal 106 from the multiplexer 150, discarding unneeded MPEG packets and generating a decompressed digital signal transmitted to the OSD module 124. The OSD module 124 can mix text, graphics, or additional video images selected by its display multiplexer with the decompressed digital signal from the transport DEMUX/MPEG decoder 122 to generate digital signals containing electronic program guide information 144, system status information, picture-in-picture, or other specialty displays requested by the user. The output video data stream 104 generated by the NTSC encoder 126 in response to the digital signal from the OSD module 124 is then transmitted to the display device 300, typically a television. In other embodiments, the NTSC encoder 126 is replaced by an encoder compatible with another standard composite video format, including but not limited to, PAL or RGB.

Concurrently, the compressed single program transport stream representation of the real-time video signal 106 from the conditional access module 114 is also transmitted to the auxiliary interface 130. The microprocessor 140 communicates with the video data stream manager 230 of the digital video recorder 200 via the auxiliary interface 130 and the recorder interface 210. Upon recognizing connection of the digital video recorder 200 to the set-top box 100, the microprocessor 140 commands the auxiliary interface 130 to continuously transmit the real-time video signal 106 to the recorder interface 210 of the digital video recorder 200.

In the preferred embodiment illustrated in FIG. 2, the auxiliary interface 130 supports isochronous communication compatible with the IEEE 1394 standard, which is described in the "IEEE Std 1394–1995 IEEE Standard for a High Performance Serial Bus," Aug. 30, 1996, which is incorporated by reference herein. The recorder interface 210 also supports isochronous communication compatible with the IEEE 1394 standard. In other embodiments, the auxiliary interface 130 and the recorder interface 210 also include asynchronous or synchronous communication capabilities to communicate various commands and information between the microprocessor 140 and the video data stream manager 230.

In particular embodiments of the present invention, the auxiliary interface 130 and the recorder interface 210 include the capability to encrypt the real-time video signal 106 sent to the video data stream manager 230 to provide protection from unauthorized copying or transporting of stored video data by removing the digital video recorder 200 and reattaching it to a different set-top box 100. Similarly, the auxiliary interface 130 and the recorder interface 210 advantageously include the capability to decrypt the recorded video signal 108 sent to the multiplexer 150 from the video data stream manager 230.

In the preferred embodiment, the auxiliary interface 130 and the recorder interface 210 are compatible with DTLA ("Digital Transmission Licensing Administrator") copying protection utilizing authentication key exchange. DTLA copy protection is a well-known copy protection system, compatible with the IEEE 1394 standard, and is described in "Digital Transmission Content Protection Specification Revision 1.0," Mar. 17, 1999, which is incorporated by reference herein. By applying DTLA copy protection to the real-time video signal 106 and the recorded video signal 108 transmitted between the auxiliary interface 130 and the recorder interface 210, the real-time video signal 106 and the recorded video signal 108 are protected from unauthorized copying.

Upon continuously receiving the real-time video signal 106 from the auxiliary interface 130, the recorder interface 210 generates a single program transport stream representation of the real-time video signal 106, which is transmitted to the video data stream manager 230. The video data stream manager 230 provides a first video stream 222 in response to the real-time video signal 106 to store a selected video segment on the disk 220. In the preferred embodiment of the present invention, the disk 220 is a component of a rotating storage drive (e.g., a hard disk drive) compatible with the IEEE 1394 standard. Alternatively, the disk 220 can be a component of a writable digital video disk (DVD) drive, or of a drive that utilizes another technology that provides writable non-volatile storage.

Upon receiving a playback command from the user input 142, the microprocessor 140 transmits an appropriate playback command to the multiplexer 150 and to the video data stream manager 230, thereby terminating the real-time interval, and initiating a playback interval. Processing of the incoming broadcast signal 102 and the recording of the real-time video signal 106 continue during the playback interval as they had during the real-time interval. In response to the playback command from the microprocessor 140, the video data stream manager 230 receives a second video stream 223 based on the selected video segment previously stored on the disk 220. The second video stream 223 is used by the video data stream manager 230 to generate a single program transport stream representation of the recorded video signal 108, which is transmitted to the recorder interface 210. The recorder interface 210 transmits the recorded video signal 108 to the multiplexer 150 via the auxiliary interface 130 of the set-top box 100.

In response to the playback command from the microprocessor 140, the multiplexer 150 transmits the recorded video signal 108 to the video output interface 120. In response to the recorded video signal 108, the video output interface 120 then transmits an output video data stream 104 to the display device, thereby permitting the user to view previously stored video images. In addition, by utilizing the auxiliary interface 130 and the recorder interface 210 to transfer data streams between the set-top box 100 and the digital video recorder 200, the digital video recorder 200 does not require an additional video input interface capable of receiving the broadcast signal 102 or an additional video output interface capable of transmitting an output video data stream 104 directly to a display device 300. Furthermore, by sharing the electronic program guide information 144 with the set-top box 100, the digital video recorder 200 does not need a modem connected to the MSO to provide programming information. In this way, the redundancy of components and functions between the set-top box 100 and the digital video recorder 200 is reduced, thereby providing a more cost-effective alternative to currently available systems.

Figure 3:
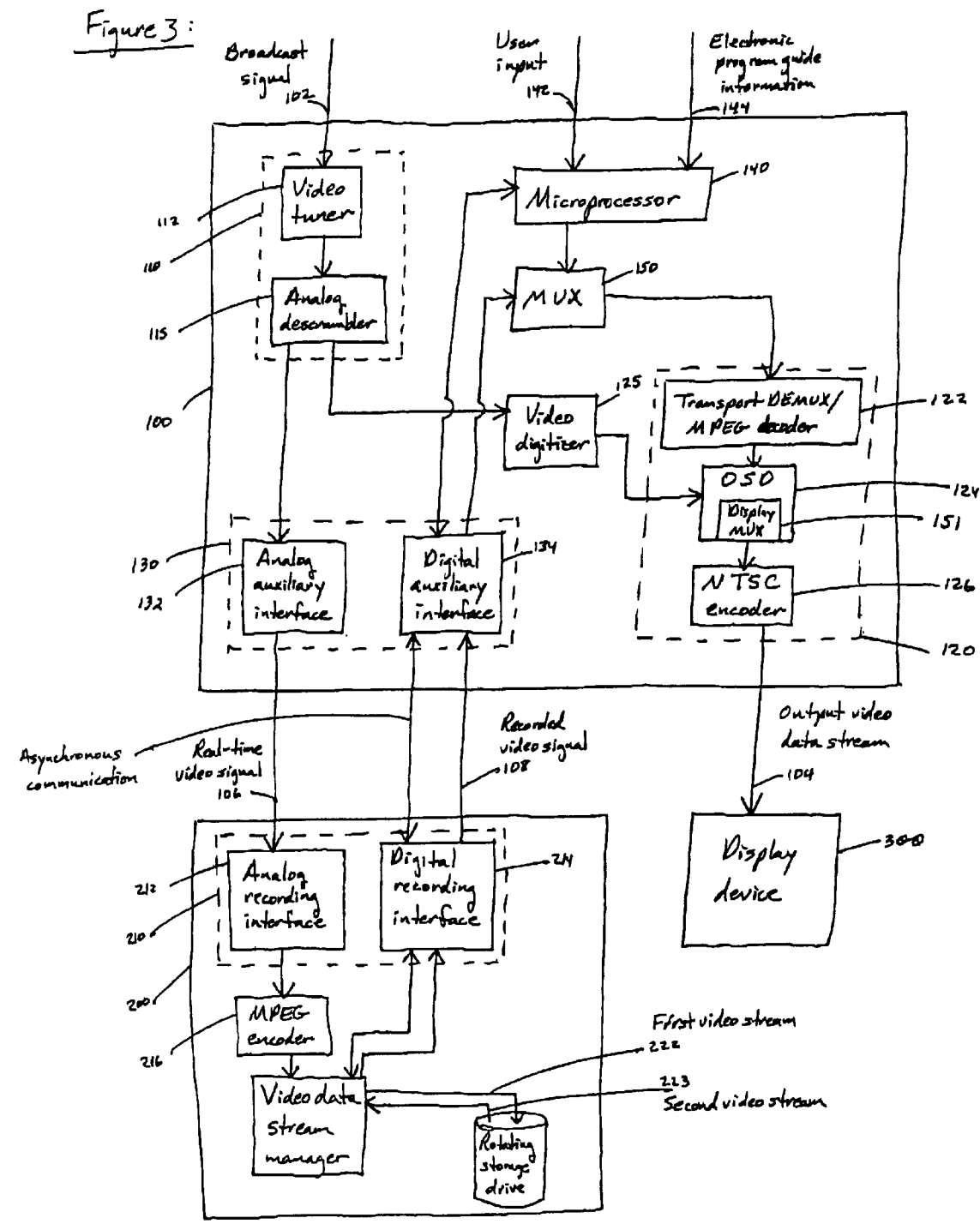
FIG. 3 schematically illustrates an exemplary embodiment of the present invention wherein the set-top box and digital video recorder are configured to be compatible with analog video programming.

FIG. 3 schematically illustrates one embodiment of the present invention compatible with an analog programming channel. The video input interface 110 comprises a video tuner 112 that receives the broadcast signal 102 and comprises an analog descrambler 115. In response to commands generated by the microprocessor 140 in response to the user input 142, the video tuner 112 selects one broadcast channel from the multiple broadcast channels contained in the broadcast signal 102 and transmits the selected broadcast channel to the analog descrambler 115. In response to the selected broadcast channel, the analog descrambler 115 generates a baseband composite video representation of the real-time video signal 106. The analog descrambler 115 provides the capability to view broadcast channels which require descrambling (e.g., for premium channels which are only accessible by a user for an additional fee). Non-scrambled broadcast channels and non-accessible scrambled broadcast channels are transmitted through the analog descrambler 115 without descrambling. In embodiments where there is no need to descramble any of the broadcast channels, the analog descrambler 115 is not included in the set-top box 100, and the video tuner 112 generates a baseband composite video representation of the real-time video signal 106. The baseband composite video representation of the real-time video signal 106 generated by the analog descrambler 115 is transmitted to the auxiliary interface 130 and to a video digitizer 125 coupled to the OSD module 124 of the video output interface 120.

The video digitizer 125 generates a digital representation of the real-time video signal 106 in response to the baseband composite video representation of the real-time video signal 106 from the analog descrambler 115. The digital representation of the real-time video signal 106 is then transmitted to the OSD module 124, which comprises a display multiplexer 151. During a real-time interval (i.e., times in which the user wants to view the broadcast signal 102 in real-time), the microprocessor 140 commands the display multiplexer 151 of the OSD module 124 to transmit the real-time video signal 106 to the NTSC encoder 126. In response to the real-time video signal 106, the NTSC encoder 126 generates an output video data stream 104 which is transmitted to the display device 300.

Concurrently, the baseband composite video representation of the real-time video signal 106 from the analog descrambler 115 is also transmitted to the auxiliary interface 130. In the embodiment illustrated in FIG. 3, the at least one auxiliary interface 130 comprises an analog auxiliary interface 132 which receives the baseband composite video representation of the real-time video signal 106. The at least one auxiliary interface 130 also comprises a digital auxiliary interface 134 that supports isochronous communication compatible with the IEEE 1394 standard and DTLA copy protection. Similarly, the at least one recorder interface 210 of the digital video recorder 200 comprises an analog recorder interface 212 and a digital recorder interface 214 that supports isochronous communication compatible with the IEEE 1394 standard and DTLA copy protection.

The analog auxiliary interface 132 continuously transmits the real-time video signal 106 via the analog recorder interface 212 to a MPEG encoder 216. In response to the continuously received real-time video signal 106, the MPEG encoder generates a single program transport stream representation of the real-time video signal 106, which is transmitted to the video data stream manager 230. In response to the real-time video signal 106, the video data stream manager 230 provides a first video stream 222 to store a selected video segment on the disk 220.

Upon receiving a playback command from the user input 142, the microprocessor 140 transmits an appropriate playback command to the multiplexer 150, to the display multiplexer 151, and to the video data stream manager 230, thereby terminating the real-time interval and initiating a playback interval. The processing of the incoming broadcast signal 102 and the recording of the real-time video signal 106 continue during the playback interval as they had during the real-time interval. In response to the playback command from the microprocessor 140, the video data stream manager 230 receives a second video stream 223 based on the selected video segment previously stored on the disk 220. The second video stream 223 is used by the video data stream manager 230 to generate a single program transport stream representation of the recorded video signal 108, which is transmitted to the digital recorder interface 214. The digital recorder interface 214 transmits the recorded video signal 108 to the multiplexer 150 via the digital auxiliary interface 134 of the set-top box 100.

In response to the playback command from the microprocessor 140, the multiplexer 150 transmits the recorded video signal 108 to the video output interface 120. The video output interface 120 comprises the transport DEMUX/MPEG decoder 122, the OSD module 124, and the NTSC encoder 126. In response to the playback command from the microprocessor 140, the display multiplexer 151 of the OSD module 124 responds to the recorded video signal 108 from the transport DEMUX/MPEG decoder 122 in generating the output video data stream 104 transmitted to the display device 300, thereby permitting the user to view previously stored video images. Note that in this particular embodiment, the display multiplexer 151 in the OSD module 124 of the video output interface 120 performs the actual selection between the real-time video signal 106 and the recorded video signal 108. This preferred embodiment of the present invention reduces the redundancy of components and functions between the settop box 100 and the digital video recorder 200, thereby providing a more cost-effective alternative to currently available systems.

Figure 4:
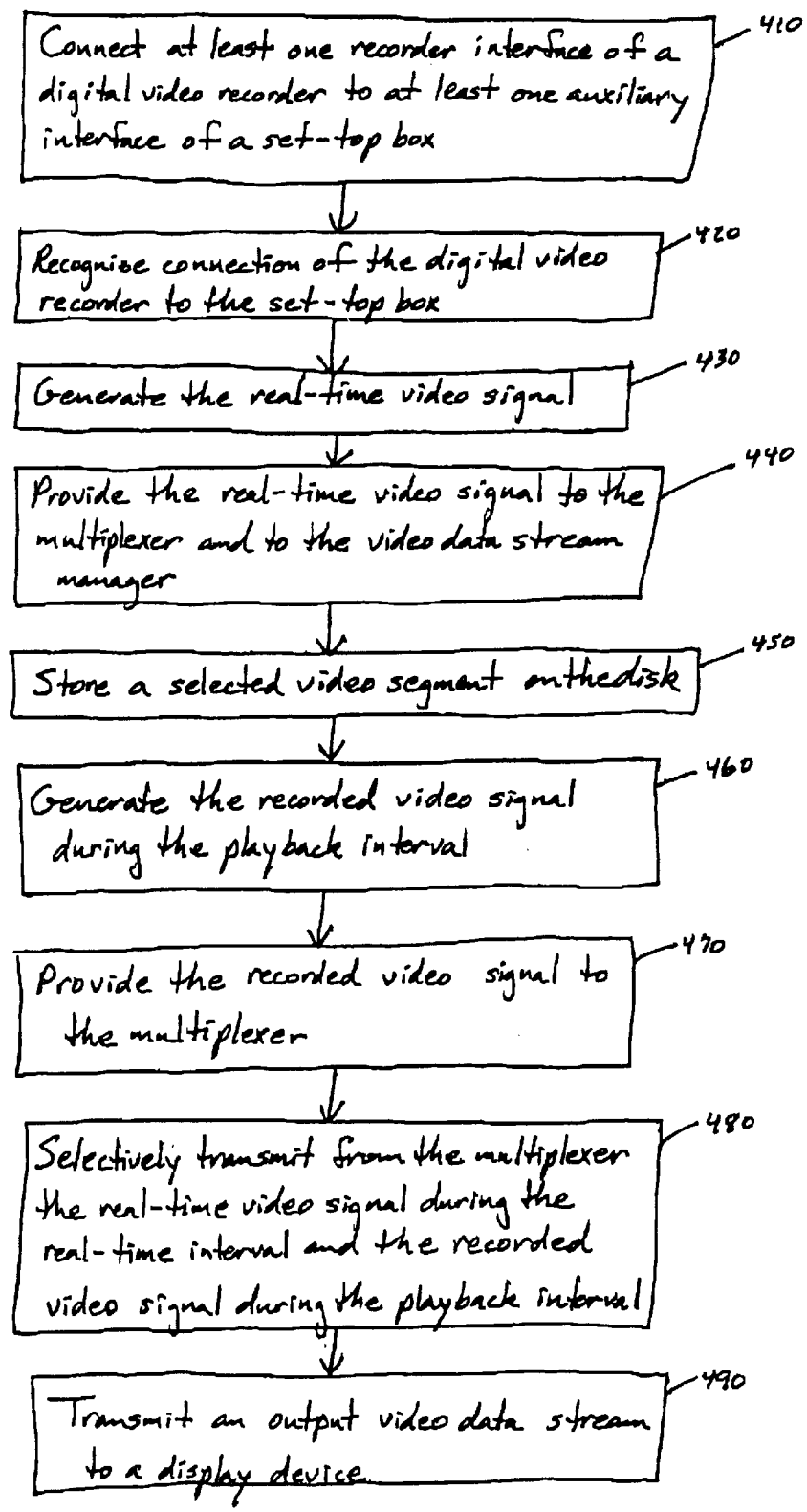
FIG. 4 is a flow diagram in accordance with an embodiment of the present invention, in which the set-top box is connectable to a recorder interface of a digital video recorder that stores a selected video stream on a disk, and that provides a recorded video signal to the set-top box during the playback interval.

FIG. 4 is a flow diagram in accordance with an embodiment of the present invention, in which the digital video recorder 200 is connectable to an auxiliary interface 130 of a set-top box 100 that provides video data stream to a display device 300 based on selection between recorded video signal 108 received from the digital video recorder 200 and a real-time video signal 106. The flow diagram is described with reference to the set-top box 100 and the digital video recorder 200 illustrated in FIG. 1. Persons skilled in the art are able to recognize that, while the flow diagram illustrates a particular embodiment with steps in a particular order, other embodiments with different orders of steps are also compatible with the present invention.

In a step 410, the recorder interface 210 of the digital video recorder 200 is connected to the auxiliary interface 130 of the set-top box 100. The set-top box includes the video input interface 10, the video output interface 120, the microprocessor 140 that generates a command in response to user input 142 that initiates a playback interval, and a multiplexer 150 coupled to the video output interface 120 and the microprocessor 140. The digital video recorder 200 includes a disk 220 and a video data stream controller 230.

In a step 420, the connection of the digital video recorder 200 to the set-top box 100 is recognized by the microprocessor 140 through communications between the microprocessor 140 and the video data stream manager 230. In the preferred embodiment of the present invention, this communication is asynchronous, and occurs via the auxiliary interface 130 and the recorder interface 210. Alternatively, the microprocessor 140 and the video data stream manager 230 utilize synchronous communication.

In a step 430, the real-time video signal 106 is generated in response to the broadcast signal 102. The broadcast signal 102 is received by the video input interface 110 of the set-top box 100.

In a step 440, the real-time video signal 106 is continuously provided to the multiplexer 150 and to the video data stream manager 230 of the digital video recorder 200. The real-time video signal 106 is continuously provided to the video data stream manager 230 via the auxiliary interface 130 and the recorder interface 210.

In a step 450, the first video stream 222 is provided to store the selected video segment on the disk 220. The first video stream 222 is provided by the video data stream manager 230 in response to the real-time video signal 106.

In a step 460, the video data stream manager 230 receives the second video stream 223 in response to the command from the microprocessor 140. The video data stream manager 230 receives the recorded video signal 108 in response to the second selected video stream 223. The playback interval is signified by a command from the microprocessor 140 in response to the user input 142.

In a step 470, the recorded video signal 108 is provided to the multiplexer 150 via the recorder interface 210 and the auxiliary interface 130 during the playback interval.

In a step 480, the multiplexer 150 selectively transmits the real-time video signal 106 during the real-time interval and selectively transmits the recorded video signal 108 during the playback interval. In a step 490, the output video data stream 104 is transmitted to the display device 300. The output video data stream 104 is generated by the video output interface 120 in response to the selectively transmitted video signal from the multiplexer 150.

What is claimed is:

1. A set-top box connectable to a digital video recorder that includes at least one recorder interface that supports connection of the digital video recorder to the settop box, a disk that stores a selected video segment, and a video data stream manager that, in response to a real-time video signal, provides a first video stream to store the selected video segment on the disk, and that, in response to a command from the set-top box that initiates a playback interval, receives a second video stream based on the selected video segment stored on the disk to generate a recorded video signal, the digital video recorder being configured to use the at least one recorder interface to (a) continuously receive the real-time video signal from the set-top box, and (b) provide the recorded video signal to the set-top box during the playback interval, the set-top box comprising:

a video input interface that receives a broadcast signal to generate the real-time video signal;

a video output interface that provides an output video data stream to a display device;

a microprocessor that recognizes connection of the digital video recorder to the set-top box, and that, in response to user input, generates the command that initiates the playback interval;

at least one auxiliary interface that supports connection of the set-top box to the at least one recorder interface of the digital video recorder, the at least one auxiliary interface continuously providing the real-time video signal to the digital video recorder subsequent to the microprocessor recognizing connection of the digital video recorder to the set-top box; and a multiplexer coupled to the video output interface and the microprocessor, wherein the multiplexer selects the real-time video signal during a real-time interval and selects the recorded video signal during the playback interval to generate the output video data stream that is provided to the display device.

2. The set-top box of claim 1, wherein the broadcast signal carries video programming in analog form.

3. The set-top box of claim 1, wherein the broadcast signal carries video programming in digital form.

4. The set-top box of claim 3, wherein the video programming is compressed under a selected compression standard.

5. The set-top box of claim 1, wherein the video input interface comprises a video tuner, a quadrature amplitude modulation demodulator, and a conditional access module.

6. The set-top box of claim 1, wherein the video output interface comprises:

a transport demultiplexer/decoder;

an on-screen display module that comprises a display multiplexer; and an encoder.

7. The set-top box of claim 6, wherein the encoder is compatible with a selected composite video format.

8. The set-top box of claim 1, wherein the at least one auxiliary interface supports isochronous communication with the at least one recorder interface of the digital video recorder.

9. The set-top box of claim 8, wherein the at least one auxiliary interface also supports asynchronous communication with the at least one recorder interface of the digital video recorder.

10. The set-top box of claim 8, wherein the at least one auxiliary interface also supports synchronous communication with the at least one recorder interface of the digital video recorder.

11. The set-top box of claim 8, wherein the at least one auxiliary interface is compatible with DTLA copy protection.

12. The set-top box of claim 8, wherein the at least one auxiliary interface is capable of encrypting and decrypting video signals.

13. The set-top box of claim 1, wherein the digital video recorder further comprises a disk drive that is connected to the video data stream manager, the disk drive including the disk.

14. The set-top box of claim 13, wherein the disk drive supports isochronous communication.

15. The set-top box of claim 1, wherein the digital video recorder further comprises a disk drive including the disk and the video data stream manager.

16. The set-top box of claim 15, wherein the disk drive supports isochronous communication.

17. The set-top box of claim 1, wherein the video input interface comprises a video tuner.

18. The set-top box of claim 17, wherein the video input interface further comprises an analog descrambler.

19. The set-top box of claim 1, wherein the set-top box further comprises a video digitizer coupled to the video input interface and the on-screen display module.

20. The set-top box of claim 19, wherein:
the video input interface transmits a baseband composite video signal to the video digitizer; and
the video digitizer transmits a real-time video signal in response to the baseband composite video signal to the on-screen display module.

21. The set-top box of claim 1, wherein the at least one auxiliary interface comprises an analog auxiliary interface and a digital auxiliary interface.

22. The set-top box of claim 1, wherein the at least one recorder interface comprises an analog recorder interface and a digital recorder interface.

23. The set-top box of claim 1, wherein the digital video recorder further comprises an encoder coupled to the at least one recorder interface and the video data stream manager.

* * * * *